United States Patent [19]

Hughes et al.

[11] 3,963,403
[45] June 15, 1976

[54] APPARATUS FOR MAKING FOAM PLASTIC PIPE

[75] Inventors: Roderick E. Hughes, Fullerton; Michael J. Conway, Bakersfield, both of Calif.

[73] Assignee: Hughes Processing, Inc., Anaheim, Calif.

[22] Filed: Dec. 13, 1974

[21] Appl. No.: 532,598

[52] U.S. Cl. ............................... 425/325; 264/45.9; 264/209; 425/379 R; 425/380; 425/404; 425/467; 425/817 C
[51] Int. Cl.² .................. B29D 23/04; B29D 27/00
[58] Field of Search .......... 425/380, 381, 378, 379, 425/817 C, 4 C, 467, 326 R, 384, 387 R, 388, 197, 198, 199, 190, 191, 192, 325, 72, 404; 264/45.9, 46.1, 209; 72/264, 268, 269

[56] References Cited
UNITED STATES PATENTS

| | | | |
|---|---|---|---|
| 3,212,135 | 10/1965 | Branscum | 425/326 R |
| 3,229,005 | 1/1966 | Reifenhauser | 425/817 C X |
| 3,393,427 | 7/1968 | Larsen | 425/380 X |
| 3,538,209 | 11/1970 | Hegler | 425/380 X |
| 3,560,600 | 2/1971 | Gliniecki | 425/4 C X |
| 3,609,809 | 10/1971 | Slicker | 264/209 |
| 3,702,226 | 11/1972 | Kim et al. | 425/380 X |
| 3,764,642 | 10/1973 | Boutillier | 425/4 C X |
| 3,870,451 | 3/1975 | Gokcen | 425/817 C X |

FOREIGN PATENTS OR APPLICATIONS

| | | | |
|---|---|---|---|
| 649,517 | 8/1937 | Germany | 425/467 |

Primary Examiner—Francis S. Husar
Assistant Examiner—Mark Rosenbaum
Attorney, Agent, or Firm—Gordon L. Peterson

[57] ABSTRACT

An apparatus for extruding a tubular article from a cellular plastic compound comprising a bushing defining a passage extending therethrough, an internal mandrel within the passage of the bushing and cooperating therewith to define a die passage, and an external mandrel downstream of the internal mandrel. The die passage has a tapered section and an outlet section with the overall width of the tapered section reducing as it extends toward the outlet. The outlet section terminates in an outlet. The gap dimension of the tapered section is greater than the gap dimension of the outlet section. The die passage has a transition section which is of progressively reducing thickness to smoothly blend the tapered section and the outlet section.

14 Claims, 5 Drawing Figures

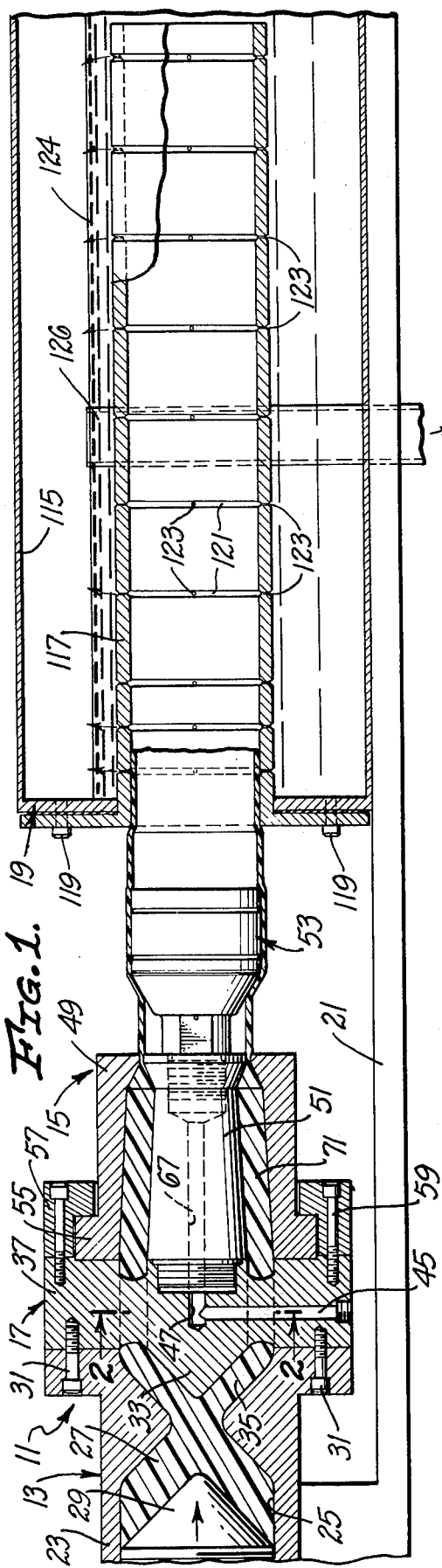
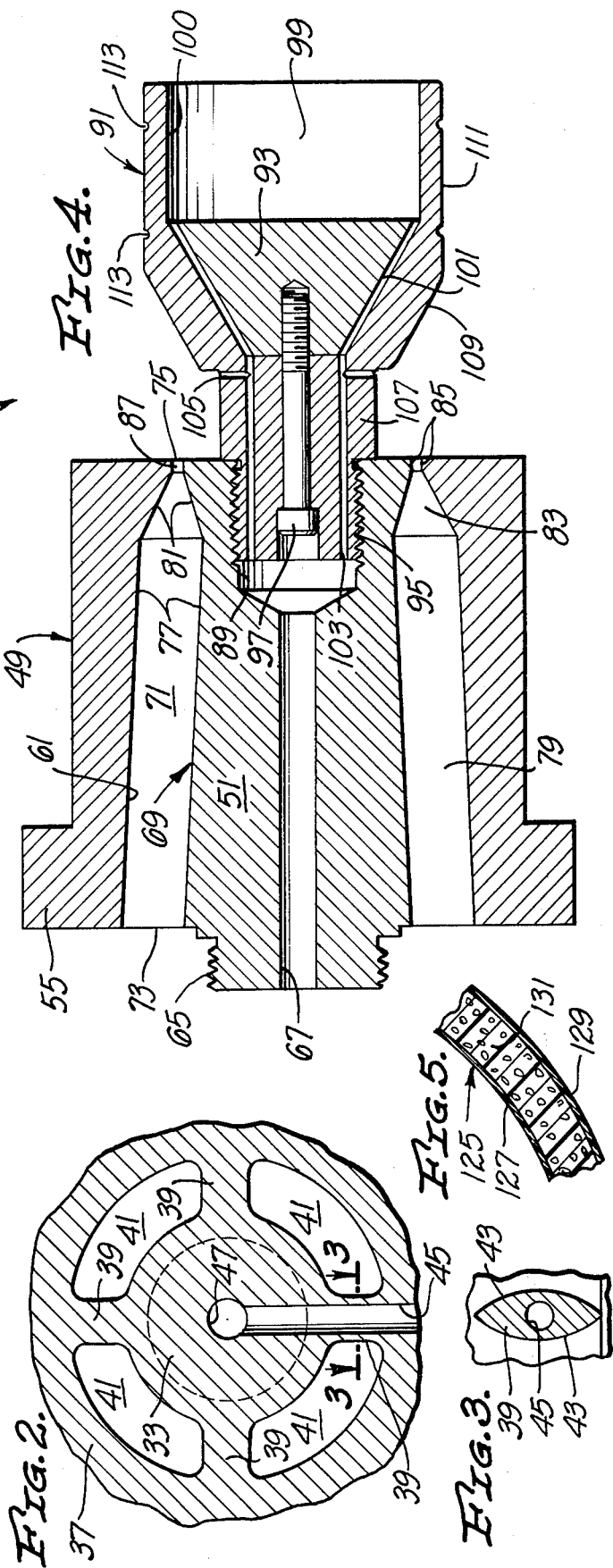

APPARATUS FOR MAKING FOAM PLASTIC PIPE

BACKGROUND OF THE INVENTION

Recently the entire world has been confronted with an energy and material shortage. Various plastic materials which were once plentiful are now in short supply.

One major use of plastic is in pipe. Plastic pipe has many applications such as in residential plumbing systems and in irrigation systems.

SUMMARY OF THE INVENTION

The present invention provides an apparatus and process for making tubular articles such as pipe from foam plastic. Because a given weight of plastic will make more pipe if the plastic is cellular, i.e. foamed, substantial conservation of plastic material is obtained.

Plastic pipe of noncellular construction is typically made in an extrusion process. Also, nontubular aritcles can be extruded from cellular plastic compound. Ostensibly, it would not be difficult to extrude pipe using a cellular foam plastic compound. However, satisfactory foam plastic pipe cannot be made using conventional extrusion tooling and techniques.

A conventional pipe extrusion apparatus includes a bushing having a passage extending through the bushing and an internal mandrel within the passage of the bushing. The mandrel and internal surface of the bushing are radially spaced to define an annular die passage which circumscribes the mandrel. The die passage has an inlet which is adapted to receive plastic material and an outlet or orifice through which plastic can be extruded. The die passage has a tapered section and an outlet section. The outlet section terminates in the outlet. The width or gap of the tapered section, i.e. the radial spacing between the mandrel and the bushing, progressively reduces as the tapered section extends toward the straight section. The outlet section is cylindrical and has a gap or width of constant dimensions.

If a cellular plastic compound is used with the above-described prior art tooling, unsatisfactory foam pipe is produced. For example, foaming of the cellular plastic compound is initiated and rapidly progresses in the tapered section of the die passage. This causes gas to be rapidly released from the cellular plastic compound. This, in turn, drastically disrupts the wall of the pipe to such an extent that the pipe is pervious to liquids.

To provide a stronger and leak resistant wall, the present invention provides a process in which foaming is substantially prevented from beginning upstream of the outlet. Rather foaming begins substantially at the outlet. To provide a solid skin, i.e. noncellular skin, on the internal surface of the pipe, the pipe is moved over an external mandrel downstream of the orifice. After passing over the external mandrel, the foam plastic pipe enters a sizing sleeve. The sizing sleeve is longer than sizing sleeves used in conventional pipe extrusion processes in order that it can externally confine the pipe until the foaming action is completed. The sizing sleeve also provides a solid skin on the exterior of the pipe. The solid skins on the interior and exterior surfaces of the pipe coupled with a closed cell core provide an impervious pipe wall.

By having a major portion of the foaming action occur downstream of the outlet, gas release from the cellular plastic compound progresses at a much slower rate than with prior art pipe extrusion tooling. In addition, the cellular plastic compound is unconfined either internally or externally for a predetermined distance downstream of the outlet, i.e. between the outlet and the external mandrel. This allows the foaming of the cellular plastic compound to increase the circumferential dimensions of the pipe as well as the wall thickness. To accommodate the increase in circumferential dimensions of the extruded pipe and to assist the increase in pipe circumference, the portion of the external mandrel which contacts the foam plastic pipe is of larger diameter than the outlet.

A basic function of the external mandrel is the formation of the solid skin on the interior surface of the pipe. To accomplish this, the external mandrel seals off the interior surface of the pipe to prevent gas release therefrom. In addition, it provides a cooling action on the plastic to augment formation of the solid skin. The skin, in addition to assuring that the pipe will be impervious, also provides added strength.

The pipe is preferably not simultaneously confined on its interior and exterior surfaces because the resulting frictional forces inhibiting movement of the pipe would be too great. Thus, the downstream end of the external mandrel is preferably axially spaced from the inlet of the sizing sleeve. Another advantage of this spacing is that it permits the sizing sleeve to have an inside diameter which is less than the outside diameter of the pipe as it leaves the downstream end of the external mandrel. Accordingly, the pipe is crowded circumferentially as it enters the sizing sleeve, and this assures a relatively tight fit of the external surface of the pipe against the internal surface of the sizing sleeve. This in turn tends to seal off the external surface of the pipe to prevent gas release and to promote formation of the solid skin on the external surface. The pipe is also cooled within the sizing sleeve to assist the discontinuance of foaming and to assist the formation of the solid skin on the exterior surface of the pipe.

One feature of the tooling of this invention which inhibits initiation of foaming is that the tapered section of the die passage has a substantially constant width, i.e. the radial gap between the mandrel and the bushing is substantially constant throughout the tapered section. This tends to reduce the pressure and temperature of the celular cellular compound and delays the initiation of foaming. To further reduce heating and to further delay initiation of foaming, the outlet section is of minimum length. For example, the ratio of land length, i.e. length of the straight section, to gap width should not exceed 7:1 whereas in the pipe prior art this ratio is of the order of 20:1 to 40:1. However, in the foam extrusion art length to width ratios of the order of 3:1 are used. The preferred ratio range is 1:1 to 3:1 with 2:1 being optimum. These features cooperate to assure that foaming does not begin until the foam plastic compound is extruded through the outlet.

As in other foam extrusion processes, the die passage has a tapered tansition section between the tapered section and the outlet section. The gap of the straight section is less than the gap of the tapered section, and the tapered transition section smoothly blends these two gaps. The tapered transition section prevents the cellular foam plastic material from degrading at this location.

It is important that the foam plastic not stick to the external mandrel. To reduce the likelihood of sticking and to assist the formation of the solid skin on the internal surface of the pipe, the external mandrel is cooled with a cooling medium such as air. To accomplish this, the external mandrel has an internal surface defining an internal passage for receiving the cooling medium to cool the mandrel and means carried by the external mandrel for deflecting the incoming cooling medium along the internal surface thereof. More specifically, the internal passage has an inlet radially inwardly of the internal surface of the mandrel and a diffuser adjacent the inlet for diverting the cooling medium from the inlet radially outwardly along the internal surface.

It has been found that heating of the external mandrel can be further reduced by providing external grooves on the mandrel. This provides regions where the plastic does not contact the mandrel and this tends to reduce heat build up.

The invention can best be understood by reference to the following description taken in connection with the accompanying illustrative drawing.

BRIEF DESCRIPTION OF THE DRAWING

FIG. 1 is a longitudinal sectional view through an extrusion apparatus constructed in accordance with the teachings of this invention.

FIG. 2 is an enlarged fragmentary sectional view taken generally along line 2—2 of FIG. 1.

FIG. 3 is a fragmentary sectional view taken generally along line 3—3 of FIG. 2.

FIG. 4 is an enlarged longitudinal sectional view of the bushing, the internal mandrel, and the external mandrel.

FIG. 5 is an enlarged fragmentary sectional view illustrating a portion of the wall of the finished pipe.

DESCRIPTION OF THE PREFERRED EMOBIMENT

FIG. 1 shows an extrusion apparatus 11 which includes an extruder 31, tooling 15, a spider 17 for attaching the tooling to the extruder, and a sizing tank 19. The extrusion apparatus 11 may be supported in any suitable manner such as by a support 21.

The extruder 13 may be of the type commonly used for the extrusion of plastic pipe and the extruder illustrated is of conventional construction. Thus, the extruder 13 may include a body 23 having a chamber 25 adapted to receive a cellular plastic compound 27. The extruder 13 also includes a screw 29 which can be axially advanced into the chamber 25 in a known manner to apply pressure to the compound 27. More than one of the screws 29 may be utilized, if desired, in accordance with conventional pipe extrusion techniques.

The spider 17 is attached to an end face of the extruder 13 in any suitable manner such as by screws 31. The spider 17 has a central hub 33 which projects axially into the chamber 25 to define along with the body 23 an extruder passage 35. The extruder passage 35 is annular in radial cross section and tapers radially outwardly as it extends toward the spider 17 as shown in FIG. 1.

The spider 17 has an annular flange 37 (FIGS. 1 and 2) which is integrally joined to the hub 33 by radially extending arm 39. Although the spider 17 can be of various different constructions, in the embodiment illustrated, four of the arms 39 are provided, and they are spaced apart circumferentally 90° to define four slots 41. Each of the arms 39 is of identical configuration. As shown in FIG. 3, each of the arms 39 is defined by oppositely facing convex surfaces 43.

The hub 17 has a radial passage 45 which opens at the periphery of the spider 17 and extends radially inwardly through the annular flange 37, one of the arms 39, and a portion of the hub 33, to intersection with an axial bore 47 in the hub. Except for the passage 45 and the bore 47, the spider 17 is of conventional construction.

The tooling 15 includes a bushing 49, an internal mandrel 51, and an external mandrel 53. The bushing 49 has an annular flange 55. A retaining ring 57 is attached to the spider 17 by screws 59 and cooperates with the annular flange 55 to mount the bushing 49 on the spider 17. The bushing 49 is preferably constructed of a suitable metal such as steel.

As shown in FIG. 4, the bushing 49 has an internal surface 61 which defines an axial passage extending completely through the bushing. The internal surface 61 is circular in radial cross section and the passage defined thereby tapers radially inwardly as it extends to the right as viewed in FIG. 4.

The internal mandrel 51, which may be constructed of a suitable metal such as steel, is mounted on the hub 33 of the spider 17 by a threaded boss 65 which is received in a mating threaded recess of the hub 33. This mounts the internal mandrel 51 within the passage defined by the internal surface 61 with the mandrel and the bushing 49 being concentric. The internal mandrel 51 has an axial passage 67 which is aligned with and communicates with the axial bore 47 in the hub 33. The internal mandrel 51 has an external surface 69 which is spaced radially inwardly of the internal surface 61 to define a die passage 71 which extends from an inlet 73 to an outlet or orifice 75.

The internal 61 and the external surface 69 have concentric frustoconcial sections 77 which extend from the inlet 73 toward the outlet 75. Each of the frustoconical sections 77 is of progressively decreasing diameter as it extends toward the outlet 75. The frustoconical sections 77 define a tapered section 79 of the die passage 71. The overall width of the tapered section 79, i.e. the diameter of the internal surface 61, progressively reduces as the tapered section extends from the inlet 73 toward the outlet 75. However, the thickness or gap of the tapered section 79, i.e. the radial spacing between the surfaces 61 and 69 is constant throughout the tapered section 79.

The surfaces 61 and 69 have conical transition sections 81 which extend from the frustoconical sections 77, respectively, toward the outlet 75. The sections 81 define a transition section having a progressively reducing thickness or gap as it extends from the tapered section 79 toward the outlet 75. Thus, no notches or sharp corners are presented within the die passage 71 through the tapered section 79 and the transition section 83.

The surfaces 61 and 69 have concentric cylindrical sections 85 which extend from the sections 81 to the outlet 75 to define an outlet section 87. The outlet section 87 has a gap, i.e. radial dimension which is constant throughout the outlet section 87 and which is the minimum gap or thickness dimension of the die passage 71. The ratio of length dimension of the outlet section 87 to the gap dimension of the outlet section is preferably of the order of 1:1 to 3:1 with 2:1 being optimum.

The axial passage 67 in the internal mandrel 51 has an enlarged threaded end portion 89. The outer mandrel 53, which may be constructed of a suitable metal such as aluminum, includes a body 91 and a diffuser 93. The body 91 has a stem 95, the outer end of which is externally threaded and received in the threaded end portion 89 to coaxially mount the external mandrel 53 on the internal mandrel 51. A screw 97 mounts the diffuser 93 within a large diameter passage 99 the latter being defined by an internal surface 100 of the body 91. The diffuser 93 is radially spaced from the body 91 to define therewith an annular flared passage 101 which is flared radially outwardly as it extends away from the internal mandrel 51. A plurality of axially extending bores 103 provide communication between the axial passage 67 and the flared passage 101. The flared passage 101 terminates in the passage 99. Any number of the bores 103 may be provided and, for example, four of these bores have been found satisfactory. A radial port 105 provides communication between each of the bores 103 and the exterior of the external mandrel 53.

The stem 95 has an unthreaded portion 107 which is immediately downstream of the outlet 75 and which is completely circumscribed by the outlet 75. The portion 107 is of lesser diameter than the inner diameter of the outlet 75 and may contain wrench flats for use in attaching the threaded stem 95 to the threaded end portion 89 of the internal mandrel 51.

The body 91 has a conical outer surface 109 which extends substantially from the portion 107 to an outer cylindrical surface 111. The conical surface 109 is axially spaced from the outlet 75. The conical surface 109 begins in a circle lying radially inwardly of the outlet 75 and terminates in a circle which is larger than the outlet 75 and which circumscribes the latter. The conical surface 109 is flared outwardly as it extends downstream, i.e. away from the outlet 75.

The cylindrical surface 111 and the conical surface 109 are concentric with the die passage 71. The cylindrical surface 111 has annular grooves 113 for cooling purposes. The length of the cylindrical section 111 can vary within relatively wide limits with a length which equals approximately one-half the outside diameter of the ultimately formed pipe being preferred.

The sizing tank 19 lies downstream of the external mandrel 53. The sizing tank 19 includes a tank 115 and a sizing sleeve 117 which is suitably mounted on the tank by screws 119 and which projects coaxially into the tank. The sizing sleeve 117, except for its length, may be of conventional construction and has a plurality of axially spaced, annular, internal grooves 121. A plurality of radial ports 123 (FIGS. 1 and 5) extend through the wall of the sizing sleeve 117 at each of the grooves 121. The sizing sleeve 117 is coaxial with the external mandrel 53 and is longer than conventional sizing sleeves. The diameter of the surface 111 of the external mandrel preferably is substantially equal to the inside diameter of the sizing sleeve 117. The tank 115 is filled with water 124 to a level just above the sizing sleeve and a vacuum is pulled in the space within the tank 115 and above the water level using a standpipe 126 and conventional techniques.

In the discussion above, under the heading Description of the Preferred Embodiment, the extrusion apparatus 11 has been described with reference to the making of cylindrical foam plastic pipe having a constant wall thickness. It will, of course, be necessary to change the geometry of the proportions of the extrusion apparatus 11 used for shaping the tubular article if the cross section of the tubular article is noncircular.

The tooling 15 is adapted for use with different cellular plastic compounds 27. For example, the cellular plastic compound 27 may be polyvinylchloride, ABS, styrene, or polyethylene.

In use of the extrusion apparatus 11, a selected cellular plastic compound 27 is placed in the chamber 25 and the screw 29 is advanced, i.e. moved to the right as viewed in FIG. 1, in accordance with conventional techniques. This compressively loads the cellular plastic compound 27 and forces it into the extruder passage 35 and ultimately through the slots 41 of the spider 17 and into the die passage 71. As the compound 27 is extruded through the slots 41, it comprises four circumferentially spaced sections which are spaced by the arms 39. As the compound 27 is forced through the tapered section 79 of the die passage 71, these circumferentially spaced sections of compound 27 are crowded together circumferentially by virtue of the convergence of the tapered section 79. Because the gap or thickness of the tapered section 79 is constant as opposed to progressively reducing, the heating and compressive loading of the compound 27 in the tapered section 79 is less than in prior art devices. Because the initiation of foaming of a cellular plastic compound is a function of temperature and pressure, the reduced temperature and compression achieved in the tapered section retards the initiation of foaming and consequent gas release. In conventional tooling where the die passage has a gap or thickness of reducing dimensions, substantial foaming would occur in the tapered section. Although minor amounts of gas may be released from the compound 27 anywhere in the die passage 71, the primary foaming process does not begin until the compound is closely adjacent the orifice 27 and preferably does not being until the compound is downstream of the outlet 75.

The compound 27 next enters the transition section 83. The smooth transition afforded by the sections 81 and the frustoconical section 77 prevents the compound 27 from degrading, i.e. hanging up and burning, at the juncture of the tapered section 79 and the transition section 83. The transistion section 83 is of progressively reducing thickness and this reduces the thickness of the wall of the pipe and increases the velocity of flow.

The compound 27 which is now in cylindrical pipe form enters the outlet section 87. Because the ratio of the length to the gap of the straight section 87 is preferably no more than about seven to one, heating due to friction of the compound 27 against the surface 85 is reduced. Consequently foaming or gas release is not significantly initiated until te compound 27 is extruded through the outlet 75.

The compound leaving the orifice 75 is in the form of a smaller diameter plastic pipe. Because the outlet 75 is axially spaced from the conical surface 109, the pipe is unsupported internally or externally in traversing this space. While the pipe is between the outlet 75 and the conical surface 109, foaming progresses and gas is released at the internal and external surfaces of the pipe. The bores 105 provide an escape path for the gases that are released from the inner surface of the pipe. Also, during this time, the pipe expands in diameter and in wall thickness due to the release of gas. The pipe ultimately strikes the conical surface 109 and travels thereover into the cylindrical surface 111. This assists the pipe in increasing in diameter.

The pipe then travels over the cylindrical surface 111 of the external mandrel 53. The engagement between the internal surface of the pipe and the cylindrical surface 111 cools the pipe and forms a seal on the inner surface of the pipe to prevent escape of the gas from the compound radially inwardly. The seal and the cooling action provide a solid skin on the inside surface of the pipe.

To prevent the foaming process from proceeding too rapidly, it is important that the heating of the pipe be minimized as it passes over the external mandrel 53. To accomplish this, the present invention provides for air cooling of the external mandrel 53. This is provided for by inducting a suitable cooling medium, such as air, from the radial passage 45 (FIG. 1) in the spider 17 through the axial bore 47, the axial passage 67, the bores 103, and the flared passage 101 to the passage 99. The diffuser 93 deflects the air from the bores 103 radially outwardly to the internal surface 100. The air exhausts from the passage 99 to the atmosphere at the end of the pipe. In addition, the annular grooves 113 on the cylindrical surface 111 provide regions of no contact between the cylindrical surface 111 and the pipe. Accordingly, at these regions there is no friction and therefore no heat build up due to friction.

The downstream end of the external mandrel 53 is spaced from the inlet to the sizing sleeve 117 as shown in FIG. 1. While the pipe is moving over the external mandrel 53, it is supported internally but not externally, The pipe then enters the sizing sleeve 117 where it is confined externally and unconfined internally. It is important that the outer surface of the pipe be in relatively tight engagement with the sizing sleeve 117. This is accomplished, in part, by making the inside diameter of the sizing sleeve 117 less than the outside diameter of the pipe as it leaves the external mandrel 53. In the embodiment illustrated, the outside diameter of the cylindrical surface 111 of the external mandrel 53 is sbstantially equal to the inside diameter of the sizing sleeve 117. Consequently, the pipe is crowded together circumferentially by the sizing sleeve 117 as the pipe enters the sizing sleeve. The spacing between the downstream end of the external mandrel 53 and the sizing sleeve 117 must be sufficient to allow this necking down and crowding action to occur.

The vacuum pressure existing outside the sizing sleeve 117 and the tank 115 also tends to hold the pipe against the inner surface of the sizing sleeve. Specifically, the ports 123 and the grooves 121 form suction regions which hold the pipe against the sizing sleeve. In addition, the grooves 121 provide regions of no contact between the sizing sleeve 117 and the pipe and consequent reduction in heat buildup. The water within the sizing tank 19 also has a substantial cooling effect which in turn assists in terminating foaming.

Holding the pipe against the inner surface of the sizing sleeve 117 provides a seal on the outer surface of the pipe and this inhibits gas release from the cellular plastic compound. This along with the cooling action provided by the sizing tank 19 provides the pipe with a solid skin on the exterior.

Foaming of the compound continues from about the outlet 75 to a location within the sizing sleeve 117. The sizing sleeve must be of sufficient length so that foaming terminates within the sizing sleeve. For this reason, the sizing sleeve 117 is longer than a conventional sizing tube.

Startup of the process described above can be accomplished using a leader and other techniques which are conventional in the extrusion of noncellular plastic pipe. The operation of the extrusion apparatus 11 described above assumes that startup has been accomplished in accordance with conventional techniques.

FIG. 5 shows a section of the wall of a pipe 125 made in accordance with this invention and with the apparatus 11. The pipe 125 has an inner skin 127 and an outer skin 129 with a core 131 of closed cell foam plastic material. The skins 127 and 129 are solid, i.e. non-cellular. The combination of two solid skins 127 and 129 and the closed cell foam plastic core 131 assures that the pipe 125 will be impervious to fluids.

Although an exemplary embodiment of the invention has been shown and described, many changes, modifications and substitutions may be made by those with ordinary skill in the art without necessarily departing from the spirit and scope of this invention.

We claim:

1. Extrusion equipment useable for making foam plastic pipe comprising:
   a bushing having an internal surface defining a passage extending therethrough;
   an internal mandrel at least partially within the passage of the bushing, said internal mandrel having an external surface which is spaced from said internal surface to define a die passage which circumscribes the internal mandrel;
   said die passage having an inlet which is adapted to receive cellular plastic compound and an outlet through which the cellular plastic compound can be extruded;
   said die passage having a tapered section and an outlet section, the overall width of the tapered section reducing as it extends toward the outlet, the outlet section terminating in said outlet;
   the gap dimension of the tapered section being greater than the gap dimension of the outlet section;
   said die passage having a transition section which is of progressively reducing thickness to smoothly blend the tapered section and the outlet section; and
   an external mandrel downstream of the outlet, the cellular plastic compound extruded through said outlet being adapted to circumscribe the external mandrel.

2. Extrusion equipment as defined in claim 1 wherein the outlet section has a length dimension and a gap dimension, the ratio of said length dimension to said gap dimension being in the range of three to one to one to one.

3. Extrusion equipment as defined in claim 2 wherein said ratio is about two to one.

4. Extrusion equipment as defined in claim 1 including means for forcing the cellular plastic compound through said die passage, a spider intermediate said forcing means and said internal mandrel, and means for attaching the internal mandrel to the spider.

5. Extrusion equipment as defined in claim 1 wherein said external mandrel has an internal surface defining an internal passage and an inlet radially inwardly of said internal surface communicating with said internal passage, said inlet being adpated to receive a cooling medium, and means for diverting the cooling medium from the inlet along a path at least one component of which extends radially outwardly toward said internal surface of the external mandrel.

6. Extrusion equipment as defined in claim 5 including means for forcing the cellular plastic compound through said die passage, a spider intermediate said forcing means and said internal mandrel, and means for attaching the internal mandrel to the spider.

7. Extrusion equipment useable for making foam plastic pipe comprising:
   a bushing having an internal surface defining a passage extending therethrough;
   an internal mandrel at least partially within the passage of the bushing, said internal mandrel having an external surface which is spaced from said internal surface to define a die passage which circumscribes the internal mandrel
   said die passage having an inlet which is adpated to receive cellular plastic compound and an outlet through which the cellular plastic compound can be extruded;
   said die passage having a tapered section and an outlet section, the overall width of the tapered section reducing as it extends toward the outlet section, the outlet section terminating in said outlet;
   means for forcing the cellular plastic compound through said die passage;
   a spider intermediate the forcing means and the internal mandrel;
   means attaching the internal mandrel to the spider;
   an external mandrel downstream of said outlet orifice, the cellular plastic compound extruded through said orifice being adapted to circumscribe and contact the external mandrel; and
   the outlet section having a length dimension and a gap dimension, the ratio of said length dimension to said gap dimension being in the range of three to one to one to one.

8. Extrusion equipment as defined in claim 7 wherein the external mandrel has grooves on the external surface thereof.

9. Extrusion equipment as defined in claim 7 including means for mounting the external mandrel on the internal mandrcl.

10. Extrusion equipment as defined in claim 7 wherein said internal mandrel has a passage for supplying the cooling medium to said internal passage.

11. Extrusion equipment useable for making foam plastic pipe comprising:
   a bushing having an internal surface defining a passage extending therethrough;
   an internal mandrel at least partially within the passage of the bushing, said internal mandrel having an external surface which is spaced from said internal surface to define a die passage which circumscribes the internal mandrel;
   said die passage having an inlet which is adapted to receive cellular plastic compound and an outlet through which the cellular plastic compound can be extruded;
   said die passage having a tapered section and an outlet section, the overall width of the tapered section reducing as it extends toward the outlet section, the outlet section terminating in said outlet;
   an external mandrel downstream of said outlet orifice, the cellular plastic compound extruded through said orifice being adapted to circumscribe and contact the external mandrel;
   said external mandrel having an internal surface defining an internal passage and an inlet radially inwardly of said internal surface communicating with said internal passage, said inlet being adapted to receive a cooling medium; and
   a diffuser adjacent the inlet for diverting the cooling medium from the inlet along a path at least one component of which extends radially outwardly toward said internal surface of the external mandrel, said path at least substantially circumscribing the difuser.

12. Extrusion equipment as defined in claim 11 wherein the internal mandrel has a passage communicating with said inlet for supplying the cooling medium to said inlet.

13. Extrusion equipment as defined in claim 12 including a spider and means for mounting the internal mandrel on the spider and wherein the spider has a passage for supplying the cooling medium to the internal mandrel, at least a section of the passage in the spider extending radially outwardly and opening at the periphery of the spider.

14. Extrusion equipment as defined in claim 12 wherein the gap dimension of the tapered section is greater than the gap dimension of the outlet section, said die passage having a transition section which is of progressively reducing thickness to smoothly blend the tapered section and the outlet section, said extrusion equipment including means for forcing the cellular plastic compound through said die passage, a spider intermediate said forcing means and said internal mandrel, and means for attaching the internal mandrel to the spider.

* * * * *